(12) United States Patent
Russell et al.

(10) Patent No.: US 11,997,219 B1
(45) Date of Patent: May 28, 2024

(54) NETWORK SECURITY FOR REMOTE WORKERS

(71) Applicant: UIPCO, LLC, San Antonio, TX (US)

(72) Inventors: Ryan Thomas Russell, San Antonio, TX (US); Emily Kathleen Krebs, San Antonio, TX (US); Stacy Callaway Huggar, San Antonio, TX (US); Jeffrey Neal Pollack, San Antonio, TX (US); Yevgeniy Viatcheslavovich Khmelev, San Antonio, TX (US); Mark Anthony Lopez, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 164 days.

(21) Appl. No.: 16/799,672

(22) Filed: Feb. 24, 2020

Related U.S. Application Data

(60) Provisional application No. 62/810,184, filed on Feb. 25, 2019.

(51) Int. Cl.
*H04L 9/32* (2006.01)
*G06F 21/62* (2013.01)
(Continued)

(52) U.S. Cl.
CPC ........ *H04L 9/3268* (2013.01); *G06F 21/6209* (2013.01); *G06F 21/84* (2013.01);
(Continued)

(58) Field of Classification Search
CPC ..... H04L 9/3268; H04L 9/30; H04L 63/0272; H04L 63/083; H04L 63/102;
(Continued)

(56) References Cited

U.S. PATENT DOCUMENTS

| 2013/0268767 A1* | 10/2013 | Schrecker | G06F 21/31 |
| | | | 713/185 |
| 2014/0047234 A1* | 2/2014 | Davis | G06F 21/6209 |
| | | | 713/160 |

(Continued)

FOREIGN PATENT DOCUMENTS

EP 2790374 A1 * 10/2014 ........... H04L 63/062

*Primary Examiner* — Shin-Hon (Eric) Chen
*Assistant Examiner* — Brian William Avery
(74) *Attorney, Agent, or Firm* — Perkins Coie LLP

(57) ABSTRACT

To protect corporate information technology (IT) networks, corporations or organizations can design their networks with secure technology. For example, before an employee can remotely access his or her company's network via a user device, a server associated with the company's network can setup an exemplary secure digital certificate for the user device. The secure digital certificate includes a public Internet Protocol (IP) address associated with a router used by the user device to access the Internet. When employee attempts to remotely access his or her company's network, the user device or a router associated with the user device can send the secure digital certificate along with a current public IP address of the router used by the user device to access the Internet. In some embodiments, if the public IP address included in the digital certificate matches the current public IP address, the user device can access the company's network.

20 Claims, 6 Drawing Sheets

(51) Int. Cl.
   *G06F 21/84*     (2013.01)
   *H04L 9/30*      (2006.01)
   *H04L 9/40*      (2022.01)
   *H04N 7/18*      (2006.01)

(52) U.S. Cl.
   CPC ............ *H04L 9/30* (2013.01); *H04L 63/0272* (2013.01); *H04L 63/083* (2013.01); *H04L 63/102* (2013.01); *H04L 63/105* (2013.01); *H04L 63/107* (2013.01); *H04L 2463/082* (2013.01); *H04N 7/18* (2013.01)

(58) Field of Classification Search
   CPC ................ H04L 63/105; H04L 63/107; H04L 2463/082; G06F 21/6209; G06F 21/84; H04N 7/18
   See application file for complete search history.

(56) References Cited

U.S. PATENT DOCUMENTS

| | | | |
|---|---|---|---|
| 2015/0033366 A1* | 1/2015 | Guffrey | H04W 4/21 726/29 |
| 2015/0103136 A1* | 4/2015 | Anderson | H04N 7/155 348/14.09 |
| 2016/0025978 A1* | 1/2016 | Mallinson | G02B 27/0172 345/8 |
| 2017/0099344 A1* | 4/2017 | Hadfield | H04L 63/20 |
| 2018/0359369 A1* | 12/2018 | Golshenas | H04L 12/1403 |
| 2018/0359639 A1* | 12/2018 | Trama | H04W 48/04 |
| 2019/0074982 A1* | 3/2019 | Hughes | H04L 9/0863 |
| 2020/0244625 A1* | 7/2020 | Tummalapenta | H04L 12/4633 |

* cited by examiner

NETWORK SECURITY FOR REMOTE WORKERS

CROSS-REFERENCE TO RELATED APPLICATIONS

This application is a non-provisional of and claims priority to U.S. Provisional Application No. 62/810,184, filed on Feb. 25, 2019, entitled "NETWORK SECURITY FOR REMOTE WORKERS," which is hereby incorporated by reference in its entirety for all purposes.

TECHNICAL FIELD

This disclosure is directed generally to methods and apparatuses for providing network security.

BACKGROUND

Several companies and organizations have setup their corporate information technology (IT) networks so that their employees can work from any place that has Internet access. To remotely access a corporate IT network, an employee may be required to log into a computer using credentials, such as a username and password. Today, employees regularly log into and access their corporate networks from home, coffee shops, or airports. For example, a consultant who regularly travels may use his or her laptop to access certain documents or send and receive emails at an airport or hotel. In another example, a software engineer can avoid rush-hour traffic in the morning by writing or reviewing software code from home or coffee shop until after the traffic subsides. Technology has made it possible for employees to have the flexibility to work from any place that has Internet access including their corporate offices. However, companies and organizations that offer remote access capabilities to their employees also face certain security risks. For example, an employee's laptop and credentials may be stolen and used to download confidential corporate information, or an employee may himself or herself remotely log into the corporate network for such nefarious purposes. In another example, an employee may be legitimately using his or her laptop in a coffee shop only to have a stranger look over the employee's laptop screen to obtain confidential information.

Figure 1:
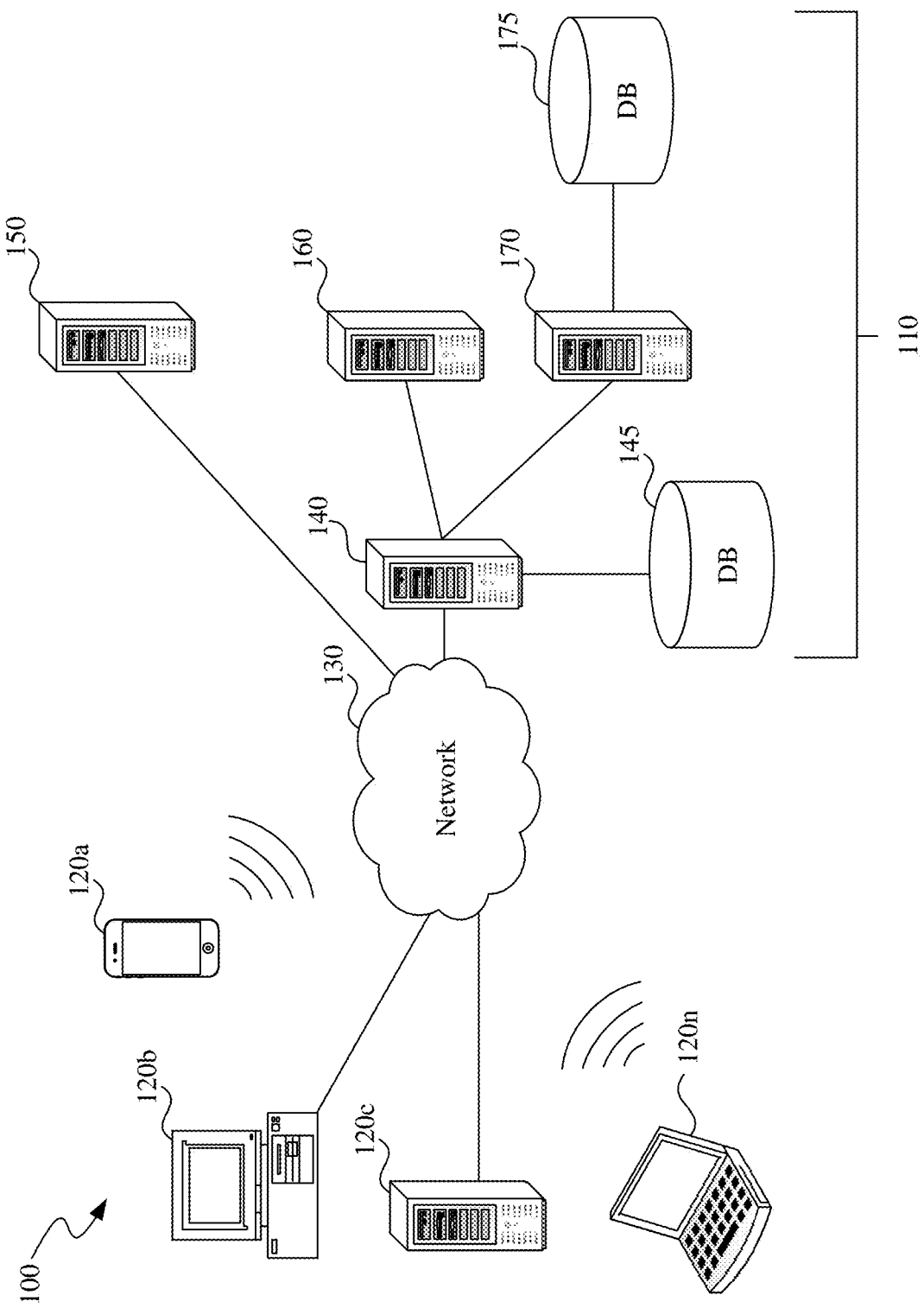
FIG. 1 shows an example system where one or more user devices remotely access a corporate network system.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Employers are increasingly allowing their employees to work remotely which poses certain security risks. An unauthorized person can steal an employee's computer and/or login credentials to remotely access a company's information technology (IT) network or services to obtain confidential information and use it against the company's interests. Corporate services may include software as a service (SaaS), such as Salesforce or Workday, so that the authentication techniques described in this patent document can be applied to network resources outside the corporate IT network. To protect corporate IT networks or corporate services, corporations or organizations can design their IT networks with secure technology as further described in this patent document. For example, before an employee can remotely access his or her company's IT network via a user device (e.g., laptop), a server associated with the company's IT network can setup an exemplary secure digital certificate for the user device. The secure digital certificate includes a public Internet Protocol (IP) address associated with a router used by the user device to access the Internet. Later, when an employee attempts to remotely access his or her company's IT network, the user device or a router associated with the user device can send the secure digital certificate along with a current public IP address of the router used by the user device to access the Internet. In some embodiments, if the corporate server determines that the public IP address included in the digital certificate matches the current public IP address, the corporate server may grant the user device access to the company's IT network. By linking a digital certificate to a public IP address of an authorized user, a company's IT network can minimize the risks associated with an unauthorized person stealing corporate confidential information. For example, even if an unauthorized person stole the authorized user's device, credentials, and router, the unauthorized person cannot use them to access a company's IT network from another location with a different public IP address. Thus, a company's IT network can be made secure by having a digital certificate linked to or associated with a public IP address. In some embodiments, the first time authentication is performed, step-up authentication is required (e.g., authentication beyond what is typically required), allowing the system to accept fewer or less secure credentials in response to future authentication requests.

The technology described in this patent document can be applicable to several corporate or consumer use cases. For example, the exemplary network security techniques can improve security when a person accesses corporate IT resources, files tax returns online, requests electronic banking service(s), or remotely accesses via the Internet a home network to communicate with one or more Internet-of-Things (IoT) devices.

The embodiments described in this patent document describe methods, apparatuses and systems for providing network security. For example, in Section I below, this patent document describes methods to enable and/or monitor a remote access session for a corporate network system. In Section II, this patent document describes techniques to protect content accessed from the corporate network system. In Section III, this patent document describes apparatuses and methods to provide security when a user device remotely accesses a corporate network system. The example headings for the various sections below are used to facilitate the understanding of the disclosed subject matter and do not limit the scope of the claimed subject matter in any way. Accordingly, one or more features of one example section can be combined with one or more features of another example section.

I. Network Security for Remote Access

FIG. 1 shows an example system 100 where one or more user devices 120a to 120n remotely access a corporate network system 110. A corporate network system 110 may include a corporate authorization server 140 used by the user devices to access the corporate network, one or more corporate servers 150, 160, 170, and one or more databases 145, 175. Data located on the one or more corporate servers 150, 160, and 170 or on the one or more databases 145, 175 can be accessed via the network 130, such as the Internet or Intranet. For example, the one or more user devices 120a to 120n can remotely access a server and/or database(s) associated with the corporate network system 110 via the network 130.

To access the corporate network system 110, each of the one or more user devices 120a to 120n may require the user (e.g., an employee) to enter his or her credentials, such as a user name and password. The user credentials are sent by each user device to the corporate authorization server 140. The corporate authorization server 140 may compare the credentials provided by the user devices to the credentials stored for each user in a corporate database 145. If the credential provided by the user matches a credential stored on the corporate database 145, the corporate authorization server 140 can provide the user with access specified for the provided credential to a corporate network system 110. For example, when a corporate authorization server 140 allows a user device 120a to access its corporate network, the user device 120a can download documents from corporate server 160 or edit customer records stored on database 175 or upload work-related content to corporate server 160.

a. Secure Digital Certificate

Figure 5:
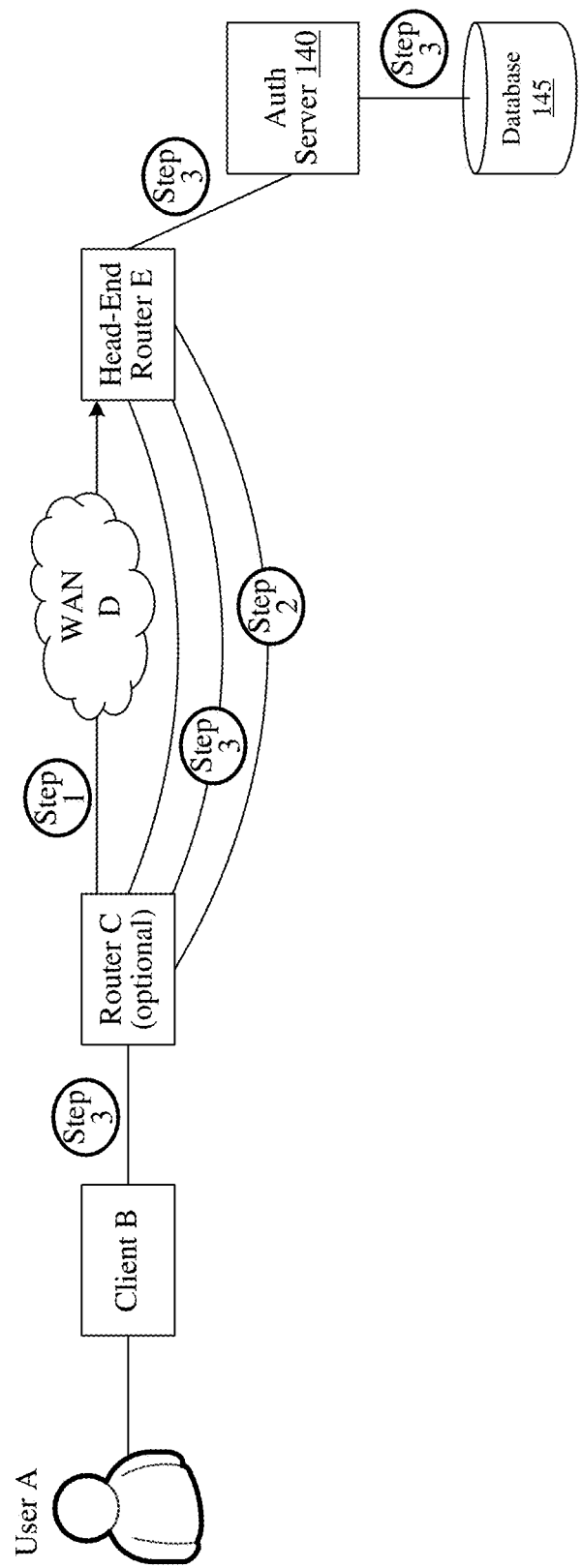
FIG. 5 shows a virtual private network (VPN) initiation process to setup a VPN tunnel where cryptographic material for the digital certificate can be generated.

FIG. 5 shows a virtual private network (VPN) initiation process to setup a VPN tunnel where cryptographic material for the digital certificate can be generated. As shown in FIG. 5, the VPN initiation process includes the following example steps:

Step 1: An optional network Router C communicates with the Head End Router E and initiates Diffie-Hellman key exchange (further described below) to create the IPSec Tunnel.

Step 2: An IPSec VPN tunnel is established

Step 3: the 802.1x process being (i.e., Extensible Authentication Protocol (EAP))

Client B uses an unauthorized port to send an EAPOL (EAP over local area network (LAN) start message to Router E.

Router E requests credentials from Client B

Client B sends certificate credential to Router E so that EAP method may begin. As further described in FIG. 6, the credential certificate may include the user's login information and/or one or more additional data such as a public IP address, MAC address, or IMEI of the device (e.g., router) used to access the corporate network system.

Router E forwards the certificate credential to the corporate authorization server 140.

The corporate authorization server 140 sends or checks the information received in the certificate credential against the information stored in the database 145.

The corporate authorization server 140 determines that Client B has access in accordance with stored policies for that credential received by Router E.

The corporate authorization server 140 sends a message to Router E to notify Client B of a connection or authentication success.

A Diffie-Hellman key exchange may use the following equation to generate a non-secret public key, Y:

$$Y = g^x \bmod(p)$$

where g is a non-secret generator value (such as a small integer), X is a server-generated secret value (e.g., generated by the corporate authorization server 140), p is a large prime number. In some embodiments, the non-secret generator value may be a value associated with a public IP address associated with the router (e.g., Router C in FIG. 5) used to access a corporate network system. In some embodiments, the non-secret generator value may be a value associated with an international mobile equipment identity (IMEI) associated with a device used to access a corporate network system. Using the equation described above, the non-secret public key (Y) can be generated by both Router C and the Router E so that a common shared secret key is generated by both devices. As further described below, the corporate authorization server 140 can generate an exemplary secure digital certificate to include the non-secret public key, Y.

The non-secret public key (Y) can be described using four pairs of hexadecimal values included in the secure digital certificate. In some embodiments, one or more pairs of hexadecimal values of the non-secret public key (Y) may be hashed using a number of hops or paths taken by an IP packet between the Client B and a device in the corporate network system (e.g., Router E or corporate authorization server 140). In some embodiments, one or more pairs of hexadecimal values of the non-secret public key (Y) may be hashed using a hardware information (e.g., MAC address, serial number of device, CPU identifier, etc.,) of the device (e.g., Client B or Router C) used to access the corporate network system.

Figure 6:
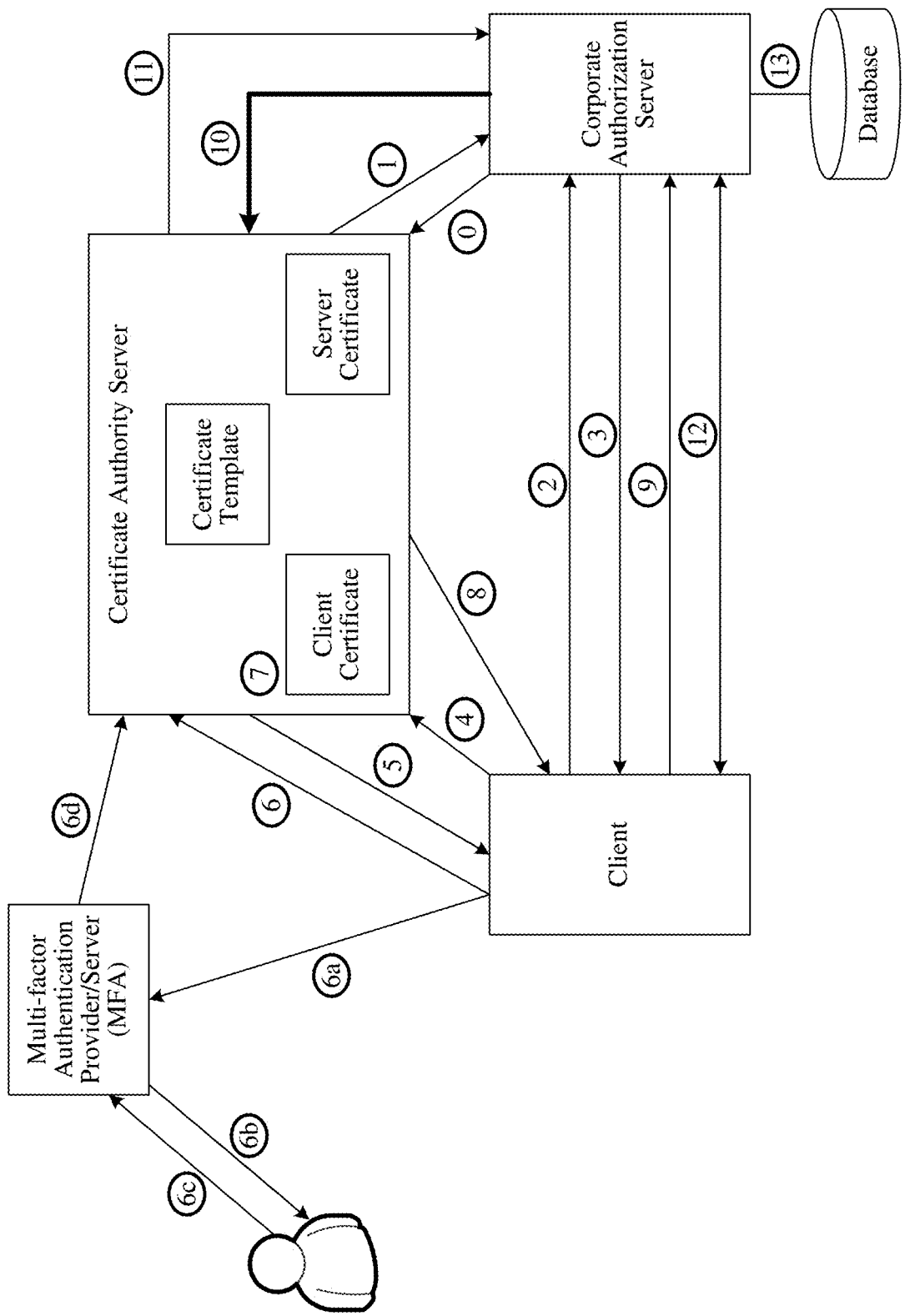
FIG. 6 describes an example secure digital certification generation and exchange process to allow a client device access to a corporate network system.

FIG. 6 describes an example secure digital certification generation and exchange process to allow a client device access to a corporate network system. At Step 0, a corporate authorization server described in FIGS. 1 and 5 sends a certificate signing request to a certificate authority server. At Step 1, a server certificate is generated by the certificate authority server and send to the corporate authorization server. At Step 2, a client device (e.g., Client B in FIG. 5) requests access to a protected resource(s) from the corporate authorization server. At Step 3, the corporate authorization server presents the server certificate to the client. At Step 4, the client sends the server certificate to the certificate authority server for verification. At Step 5, the certificate authority server sends a message to the client to acknowledge that the server certificate is valid.

Steps 6, 6A-6D, 7 and 8 further describe the process of generating the secure digital certificate described in this patent document. At Step 6, the client generates and sends a certificate signing request and one or more additional data to the certificate authority server. The one or more additional data may include telemetry associated with the client such as the public IP address of the router used to access a network, private or local IP address, CPU identifier, universally unique identifier (UUID), hardware identifier, token identifier (if physical security token or trusted platform module (TPM) is installed), or multi-factor authorization provider information for step-up authentication process. The benefit of using information in addition to the public IP address is that it can help create a machine identity that can be based in part on a client device's current network location or path. For example, a person may access the corporate network system by tethering his or her computer to a mobile device (e.g., a smartphone). In such embodiments, the digital certificate used to access the corporate network system may include the IMEI and/or one or more additional data as describe above to identify the machine (e.g., mobile device) used to access the corporate network system.

At Step 6A, the client sends a notice or message to the multi-factor authorization (MFA) provider server that the client has sent the certificate signing request to the certificate authority server. At Step 6B, the MFA server requests token or password or additional factor such as biometric or Fast ID online (FIDO) token, or time-based one-time password (TOTP). At Step 6C, the user via the client supplies the information for the token or password or additional factor (e.g., by providing biometric information). At Step 6D, the MFA server notifies the certificate authority server to release the client certificate to the client if MFA server determines that the received token or password or additional factor matches or is the same as the information stored on the MFA server or its database. At Step 7, the certificate authority server generates the secure digital certificate with the one or more additional data as attributes readable to the corporate authorization server. At Step 8, the certificate authority server sends the secure digital certificate to the client. In some embodiments, the secure digital certificate is received by and stored on a router that is used by the client to access the Internet or to access a corporate network system.

At Step 9, the client presents the secure digital certificate to the corporate authorization server. At Step 10, the corporate authorization server sends a request with the secure digital certificate to the certificate authority server to check or validate the secure digital certificate. At Step 11, the certificate authority server compares the secure digital certificate received from the corporate authorization server with a secure digital certificate associated with the client. If two secure digital certificates match or have certain information/code that is the same, then the certificate authority server sends a message to the corporate authorization server that the secure digital certificate is valid. In response to receiving the message validating the secure digital certificate at Step 11, at Step 12, the corporate authorization server grants the client access to the corporate network system via a virtual private network (VPN) service. At Step 13, the corporate authorization server sends connection telemetry to the database, where the connection telemetry may include extended data, connection start or stop time, or first found per extended data, etc. In some embodiments, a same server may perform the operations described for the corporate authorization server and the certificate authority server in FIG. 6.

Returning to FIG. 1, a user device remotely accesses a corporate network system 110 by initiating a virtual private network (VPN) service with and/or requesting the VPN service from the corporate authorization server 140. As described in FIG. 6, the corporate authorization server 140 may require a third-party (also known as a certificate authority) to generate a digital certificate that can be used by the corporate authorization server 140 to authenticate the identity of the user device. By authenticating the identity of the user device, the corporate authorization server 140 can allow the user device to remotely access the corporate network system 110. The digital certificate generated by the issuer may include a name of the issuer of the digital certificate, the public encryption key associated with the user device, and the identity of the user device. The generated digital certificate is stored in a router that is used by the user device to access the corporate network 110.

In a conventional system, after the user device initiates or requests the VPN service, the router sends a digital certificate to the corporate authorization server 140, and the corporate authorization server 140 uses the digital certificate to authorizes the user device for remote access to the corporate network system 110. However, such a conventional system does not provide a secure network access. A thief engaged in corporate espionage can access to the corporate network system 110 by stealing the user's device, credentials, and router. Thus, a conventional digital certificate provided by an issuer and stored on a router may not provide sufficient security to prevent unauthorized access to the corporate network system 110.

To overcome at least some of the drawbacks of the conventional security system, the corporate authorization server 140 along with a certificate authority server can setup a secure digital certificate as described in FIGS. 5 and 6 to be used by a user device to securely access the corporate network system 110. In an exemplary embodiment, the secure digital certificate may include the public IP address of a router that is used by the user device to remotely access the corporate network system 110. An Internet Server Provider (ISP) provides a public IP address to a networking hardware, such as a router.

A certificate authority server can generate the secure digital certificate as described in FIG. 6. For example, the certificate authority server receives from a user device a request to generate a digital certificate. The request may include one or more additional data, such as a public IP address associated with the user device. In response, the certificate authority server generates and sends the digital certificate to a router associated with the user device. The digital certificate is generated to include the public IP address received from the user device, where the public IP address may be the IP address assigned by an ISP to the router used by the user device to access the Internet. In some embodiments, the digital certificate can be encrypted using the public key of the user device. By providing a digital certificate associated with the public IP address, a thief or an unauthorized person cannot remotely access the corporate network system from a public IP address unauthorized for remote access. Thus, for example, a thief may steal a user's device, credentials, and router, but cannot use them to remotely access the corporate network system from the thief's home.

After the certificate authority server sends the secure digital certificate to the router associated with the user device, as explained above, the user device can remotely access the corporate network system as described below. After the secure digital certificate is sent to the user device, the user device sends the secure digital certificate to the corporate authorization server 140 that validates the received secure digital certificate as explained in FIG. 6.

When the user device wants to request remote access from the corporate authorization server 140, the user device sends a request to provide a virtual private network (VPN) service to the user device. The request for VPN service may include a current public IP address associated with the user device. The current public IP address may be the public IP address associated with the networking hardware used by the user device to access the Internet. If the server determines that the public IP address included in the previously received digital certificate matches the current public IP address, the server grants the user device access to the VPN service.

A secure digital certificate that includes a public IP address is an unconventional solution for several reasons. First, a security system may not be setup to employ a Diffie-Hellman key exchange to generate a common non-secret public key, Y, because doing so may increase the system complexity. Second, a security system may not use a digital certificate linked to a public IP address because ISPs periodically change public IP addresses. If a digital certificate linked to a periodically changing public IP address, a user may experience frustration with his or her remote access that used to work at a location (e.g., home) at one time but no longer works at that same location at another time. However, such a consequence of the exemplary secure digital certificate can be mitigated with additional security measures as further explained in this patent document. For example, a corporate network system may employ a manual process or an automated process or a combination of both to re-issue, re-authorize, or newly create a digital certificate for a user device that had a digital certificate expire due to a newly assigned public IP address. In some embodiments, a time of ownership of the public IP address may be tracked in part by a database tracking start or stop time, or time first detected with a set of credentials (e.g., the one or more additional data) or the public IP address, etc., Using the time of ownership, the corporate authorization server can determine when a particular digital certificate may expire and send an appropriate message to the user device affected prior to the expiration of its digital certificate.

A third reason why a security system may not use a digital certificate linked to a public IP address is that at least some remote access users may not be remotely accessing a corporate network system from the same location every time. For example, some employees may be required to travel for work and may remotely access the corporate network system from several different locations (e.g., home, airport, or hotel). However, the exemplary secure digital certificate can be designed to avoid a one size fits all approach. For example, a corporate authorization server can employ the exemplary secure digital certificate for certain employees who do not travel and who remotely access the corporate network system from one or more known locations (e.g., home and coffee shop). Some employees may be authorized to work only from a particular remote location (e.g., home, rented office space) because they deal with confidential customer information. Thus, this solution prevents such employees from working in non-sanctioned areas. A digital certificate can be re-issued, re-authorized, or replaced if a server (e.g., the corporate authorization server 140) determines that the digital certificate has expired. The server may determine that a digital certificate has expired if the server determines that the public IP address included in the digital certificate does not match the current IP address provided by the user device. If the digital certificate has expired, the server can send a message to the user device that indicates that the user may have to perform a validation step to re-authorize the digital certificate associated with the user device. In some embodiments, if a server determines that a digital certificate has expired, the server may allow the user device to remotely access a less secure part of the corporate network system. In such embodiments, when a proper digital certificate with the updated public IP address has been issued to the user device, the server can allow the user device to remotely access the secure part of the corporate network.

An example of a validation step may include having the user execute a software program to provide the new public IP address to the certificate authority server to generate an updated digital certificate that includes the new public IP address of the user device. The updated digital certificate can be sent by the certificate authority server to the user device, which can send the updated digital certificate to the server (e.g., corporate authorization server), as described in FIG. 6. In some embodiments, a mutual SSL authentication protocol running on the corporate authorization server can track a received IP address to the public IP address in the additional attributes of the digital certificate. If they do not match, an access port may shut down and require a step-up authentication (e.g., multi-factor authentication). Another example of a validation step is to have the user call a person that manages the digital certificates and provide the new public IP address associated with the user device.

b. Schedule-Based Network Security

A user's work schedule can be used to provide additional network security. A schedule-based security can be an effective deterrent to users who may, for example, pry into corporate servers to obtain confidential information at a time when they may not be scheduled to work. In some embodiments, a server grants the user device access to the VPN service if (1) the server determines that the public IP address included in the digital certificate matches the current public IP address provided by the user device and (2) the server determines that a user requesting access to the VPN service is scheduled to work at a time when the request for VPN service is received by the server or sent by the user device. The work schedules of the users authorized to remotely access the corporate network system may be stored on database 145 so that it can be accessed by the corporate authorization server 145.

c. Data Usage Based Network Security

Monitoring user device data usage can also be used to provide additional network security. For example, a corporate authorization server 140 may have access to a user profile of users who remotely access the corporate network system 110. A user profile may include information such as an employment title of the user, a time period when the user is authorized to work, and an amount of data that the user can or is expected to upload or download from the corporate network system 110. The user profile may be stored on a database in the corporate network system 110 and may be associated with a login information provided by a user when the user device requests a VPN service. For example, when a user device sends a request for a VPN service, the request may include a login information that the corporate authorization server 140 can use to obtain a user profile of the user. Based on the user profile, the corporate authorization server 140 or another server may monitor the user's data usage.

In some embodiments, a server (e.g., corporate authorization server 140) may deny the user device access to the VPN service used by the user device if the server determines that the user device requests or has downloaded an amount of data that exceeds a pre-determined limit. The pre-determined limit may be based on a user profile associated with a login information provided to the server. For example, if the user profile states that the user requesting remote access has an employment title of a "software developer," then the pre-determined limit for that user profile may be 1 gigabyte per remote access session, but if the user profile states that the user requesting remote access has an employment title of a "customer service representative," then the pre-determined limit for that user profile may be 100 megabytes per remote access session. In some embodiments, per-user or per-subgroup exceptions can be created. For example, users with an employment title of "software developer" may have a pre-determined limit of 1 GB per session, but a specific user with a "software developer" employment title may be allowed to have a pre-determined limit of 5 GB per session. In some embodiments, a server may set pre-determined limits on session counts or concurrence of frequency of usage by a user. A session count is beneficial so that a user may not circumvent the pre-determined data limit per remote access session by opening up multiple sessions to access data exceeding the single session pre-determined limit. As an example, a server may set a pre-determined limit of one session for a user.

II. Network Security for Content Protection

Section II describes exemplary embodiments to protect content that is remotely accessed by a user device from a corporate network system. Corporate content may include certain confidential or sensitive information that may harm a company's or an organizations' reputation if such information is viewed by an unauthorized person. For example, an employee who is authorized to remotely access a corporate network system and who works in a public area (e.g., airport) may inadvertently reveal confidential information to bystanders when the employee opens or reads confidential documents. To protect confidential information or content, the exemplary corporate network system may employ certain safeguards to protect content viewed at a public location.

In an exemplary embodiment, a server (e.g., a corporate authorization server 140) may determine whether a user device is requesting access to a VPN service from a public area (e.g., an airport or coffee shop) by receiving from the user device an audio or an image or a geolocation associated with a location where the user device is used to request access to a VPN service. The audio or image (e.g., a still image or a video of a pre-determined length) or a geolocation can be analyzed by the server to determine whether the user device is in a public area. For example, if an analysis of the audio indicates that a level of sound is above a pre-determined level, then the server may determine that the user device is located in a public area. In another example, if an analysis of the image revels that more than one person is located in front of the user device, then the server may determine that the user device is located in a public area. In yet another example, the server may determine that the user device is located in a public area if the geolocation provided by the user device is associated with a public area. In some embodiments, the server determines that the user device is located in a public area based an entity that owns or is associated with the public IP address provided by the user device when requesting the VPN service.

One way to geolocate without relying much on actual GPS or Geo-IP would be to look at the eSSID and bSSID lists. If a SSID remains constant and a certain percentage of the MAC addresses of the wireless radios are known to be associated with that network around the user device and on the same layer 2 network, then the user device may be considered to be located in the same physical area as the approved site. In some other embodiments, a user device may send a number of Wi-Fi connections available to the user device over a pre-determined signal strength to the server. Based on the number of Wi-Fi connections available to the user device, the server can determine whether the user device is in a public area.

If the server determines that the user device is located in a public area, the server may perform any one of following: (1) restrict access to a document that is confidential or that is restricted to a user of the user device, (2) redact one or more confidential portions of a document sent to the user device, and/or (3) provide a non-confidential summary version of the document. For example, a server may restrict access to a document by not allowing the user device to open that document. In some implementations, the document may be "grayed-out" on a display associated with the user device to indicate that the document cannot be opened while the user device is in the public area, or the user may receive a notice when trying to open the confidential document that states that that document cannot be accessed while the user device is in a public area. In some implementations, the server may allow the user device to open the confidential document in a public area, but the server may redact one or more confidential portions of the document and/or provide a summary of the document that does not include the confidential information. The summary version could include an action list for the remote worker.

In some embodiments, the server may provide or enable different (or additional) security measures from the ones mentioned above in Section II if a user device is determined to be located in a public area. For example, if a server determines that a user device is located in a public area, using the exemplary techniques described above in Section II, the server may additionally determine that a privacy screen is installed in front of a display associated with the user device. The server can determine that the privacy screen is installed in front of the display by receiving an image obtained from a camera associated with the user device, where the image provides a color profile of the display. In some implementations, the color profile related image is obtained by the user device (e.g., a laptop) when its lid is closed. When the lid is closed, the user device display shines light that may include specific colors that can be received by the camera and analyzed the user device or server. In such embodiments, the server can grant the user device access to the VPN service if the server (1) determines that the public IP address included in the digital certificate matches the public IP address provided by the user device as part of requesting the VPN service, and (2) determines that the privacy screen is being used by the user device.

In some embodiments, the server may provide or enable require different (or additional) security measures from the ones mentioned above in Section II based on a user's user profile. The user profile-based content protection may be enabled by the server irrespective of whether the user device is located in a public area.

In some embodiments, the server (e.g., a corporate authorization server 140) determines a level of access to a document by a user of the user device. The level of access is determined by the server based on a user profile. As mentioned in this patent document, the user profile is associated with a login information that is included in request made by the user device for a VPN service. The user profile can be associated with the user's employment role or employment title. For example, the user profile can indicate that a person whose login is provided by the user device is a software developer. Based on this information, the server may determine that the software developer may access certain confidential information related to corporate best practices for software development or an infrastructure map for the corporate network system. By using the user profile, the server can determine a level of access for the user associated with the user profile. Based on the level of access determined by the server, the server may perform any one of following: (1) allow the user access to the document if the server determines that the level of access allows the user to access all types of documents, (2) restrict the user access to the document if the server determines that the level of access is limited to non-confidential documents, and (3) allow the user to access non-confidential portions of the document if the server determines that the level of access is limited to non-confidential documents. In some implementations, the server may provide the user access to non-confidential portions of a document by redacting the confidential portions of the document and then sending the redacted document to the user device.

III. Network Security Devices

Section III describes exemplary embodiments that use one or more security devices to enable different (or additional) security measures from the ones mentioned above in Sections I and II. In some embodiments, a server (e.g., a corporate authorization server 140) may receive audio or video data from an electronic eyeglass via the user device used to VPN into the corporate network system. The electronic eyeglasses may have a microphone input and a camera, a rechargeable battery, and a speaker. In some embodiments, the server may use the content provided by the electronic or digital eyeglasses to monitor, collect or observe the real-world. In a security related example, a customer service representative working from home may remotely access the corporate network system and the eyeglasses may record audio and/or video of the images seen by the representative. The electronic eyeglasses send the recorded audio/video to the server that analyzes that data to determine whether the customer service representative is working or is engaging in unauthorized activity. In a non-security related example, a claims adjuster may use the electronic eyeglasses to record audio and/or video from a remote location while accessing the corporate network system. Based on the audio/video received from the electronic eyeglasses, a claim adjuster manager sitting in the office may instruct the claim adjuster to take certain actions (e.g., asking certain questions).

In some embodiments, the screen can display a code (e.g., invisible to the naked eye but viewable through the glasses) of a unique pattern over each of the monitors associated with the current session. Additional telemetry may be included (e.g., user, machine name, monitor number, monitor layout per their OS, some server-side generated key, etc.), and all or some of the data can be relayed to the server. If at any point the user is looking at a screen that does not have the overlay, it may indicate that the user needs to be reviewed to determine if there is a security issue (e.g., was the user simply checking their personal laptop or is there a potential security breach?). The amount of time spent without the overlay might be a factor here, but another factor can be whether or not the same data is seen on both the overlay and non-overlay screens. For example, is the server or camera that is seeing the data on the corporate screens also seeing the data on the non-corporate screens? Such data can possibly indicate data loss. Further security examples may include looking for common brands/signs/price tags, or a variety of different faces.

Figure 2:
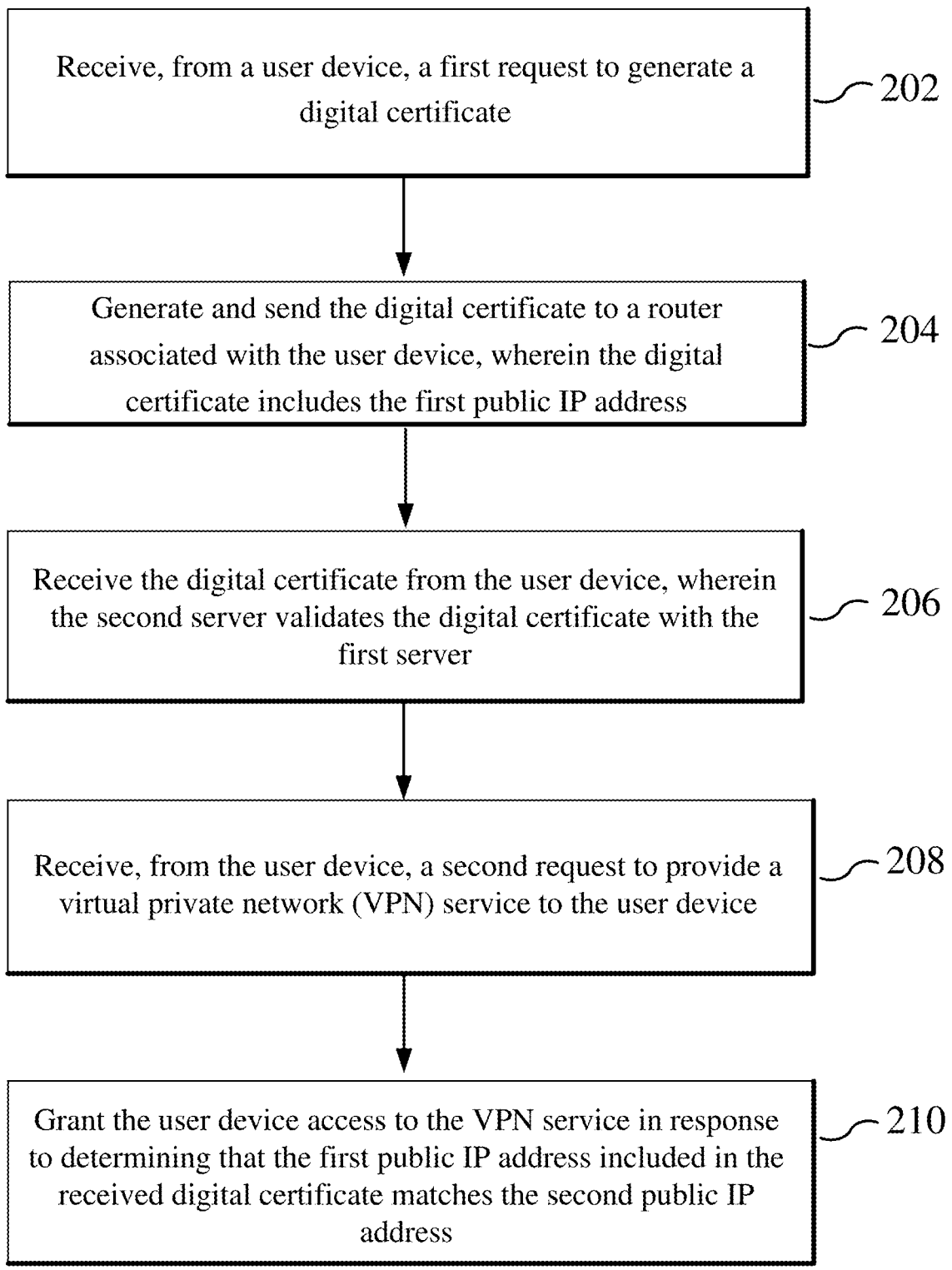
FIG. 2 shows an exemplary flow diagram to provide network security.

FIG. 2 shows an exemplary flow diagram to provide network security. Operations 202 to 204 describe example operations to provide a secure digital certificate that includes a public IP address to a user device. Operations 202 to 204 are included as part of the example secure digital certification generation and exchange process of FIG. 6. Operations 206 to 210 describe example operations for the user device to use the secure digital certificate to request a secure remote access from a corporate network system.

At a receiving operation 202, a first server (e.g., certificate authority server) receives, from a user device, a first request to generate a digital certificate. The first request may include a first public Internet Protocol (IP) address associated with the user device.

At the generating operation 204, the first server generates and sends the digital certificate to a router associated with the user device, wherein the digital certificate includes the first public IP address. In some embodiments, the digital certificate is encrypted using a public key associated with the user device. In some embodiments, the first request includes one or more additional data that identifies the user device, where the digital certificate is generated to include the one or more additional data. In some embodiments, the one or more additional information includes: a private IP address of the user device, a central processing unit (CPU) identifier of the user device, a universally unique identifier (UUID) associated with the user device, a hardware identifier associated with the user device, a token identifier associated with the user device, or a multi-factor authorization provider information associated with the user device At the receiving operation 206, a second server (e.g., corporate authorization server) receives the digital certificate from the user device, wherein the second server validates the digital certificate with the first server.

At the receiving operation 208, the second server receives, from the user device, a second request to provide a virtual private network (VPN) service to the user device, wherein the second request includes a second public IP address associated with the user device. At the granting operation 210, the second server grants the user device access to the VPN service in response to determining that the first public IP address included in the received digital certificate matches or is the same as the second public IP address. In some embodiments, the second server is configured to grant the user device access to the VPN service in response to determining that the first public IP address included in the digital certificate matches the second public IP address and in response to determining that a user requesting access to the VPN service is scheduled to work at a time when the second request is received by the second server or sent by the user device. In some embodiments, the first public IP address is same as the second public IP address.

In some embodiments, the second server determines that the digital certificate has expired in response to determining that the first public IP address included in the digital certificate does not match the second IP address, and the second server sends a message to the user device in response to determining that the digital certificate has expired, wherein the message indicates that a validation step is to be performed to re-authorize the digital certificate.

In some embodiments, the second server is configured to deny the user device access to the VPN service used by the user device in response to determining that the user device requests or has downloaded an amount of data that exceeds a pre-determined limit, where the pre-determined limit is based on a user profile associated with a login information included in the second request.

In some embodiments, the second server is configured to receive, from the user device, an audio or an image or a geolocation associated with a location where the user device is used to request access to the VPN service, determine that the user device is located in a public area based on the audio, the image, the geolocation, or an entity that owns or is associated with the second public IP address, and perform any one of following in response to determining that the user device is located in the public area: (1) restrict access to a document that is confidential or that is restricted to a user of the user device, and (2) redact one or more confidential portions of a document sent to the user device.

In some embodiments, the second server is configured to receive, from the user device, an audio or an image or a geolocation associated with a location where the user device is used to request access to the VPN service, determine, based on the audio or the image or the geolocation, that the user device is located in a public area, and determine that a privacy screen is installed in front of a display associated with the user device in response to determining that the user device is located in a public area. In such embodiments, the second server is configured to grant the user device access to the VPN service in response to determining that the first public IP address included in the digital certificate matches the second public IP address and in response to determining that the privacy screen is being used by the user device. In some embodiments, the second server is configured to determine that the privacy screen is installed in front of the display by receiving an image obtained from a camera associated with the user device, where the image provides a color profile of the display.

In some embodiments, the second server is configured to determine a level of access to a document by a user of the user device, where the level of access is determined based on a user profile associated with a login information included in the second request, and where the user profile is associated with the user's employment role or employment title. Based on the level of access determined by the second server, the second server is configured to perform any one of following: (1) allow the user access to the document in response to determining that the level of access allows the user to access all types of documents, (2) restrict the user access to the document in response to determining that the level of access is limited to non-confidential documents, and (3) allow the user to access non-confidential portions of the document in response to determining that the level of access is limited to non-confidential documents. In some embodiments, the second server is configured to receive audio or video data from an electronic eyeglass via the user device.

In some embodiments, a third server (e.g., an MFA provider server) is configured to receive a first message from the user device that the user device has sent the first request to generate the digital certificate; send a third request to the user device to provide a password associated with a user of the user device; and in response to determining that the received password matches previously known password associated with the user, send a second message to the first server to generate and send the digital certificate to the user device.

Figure 3:
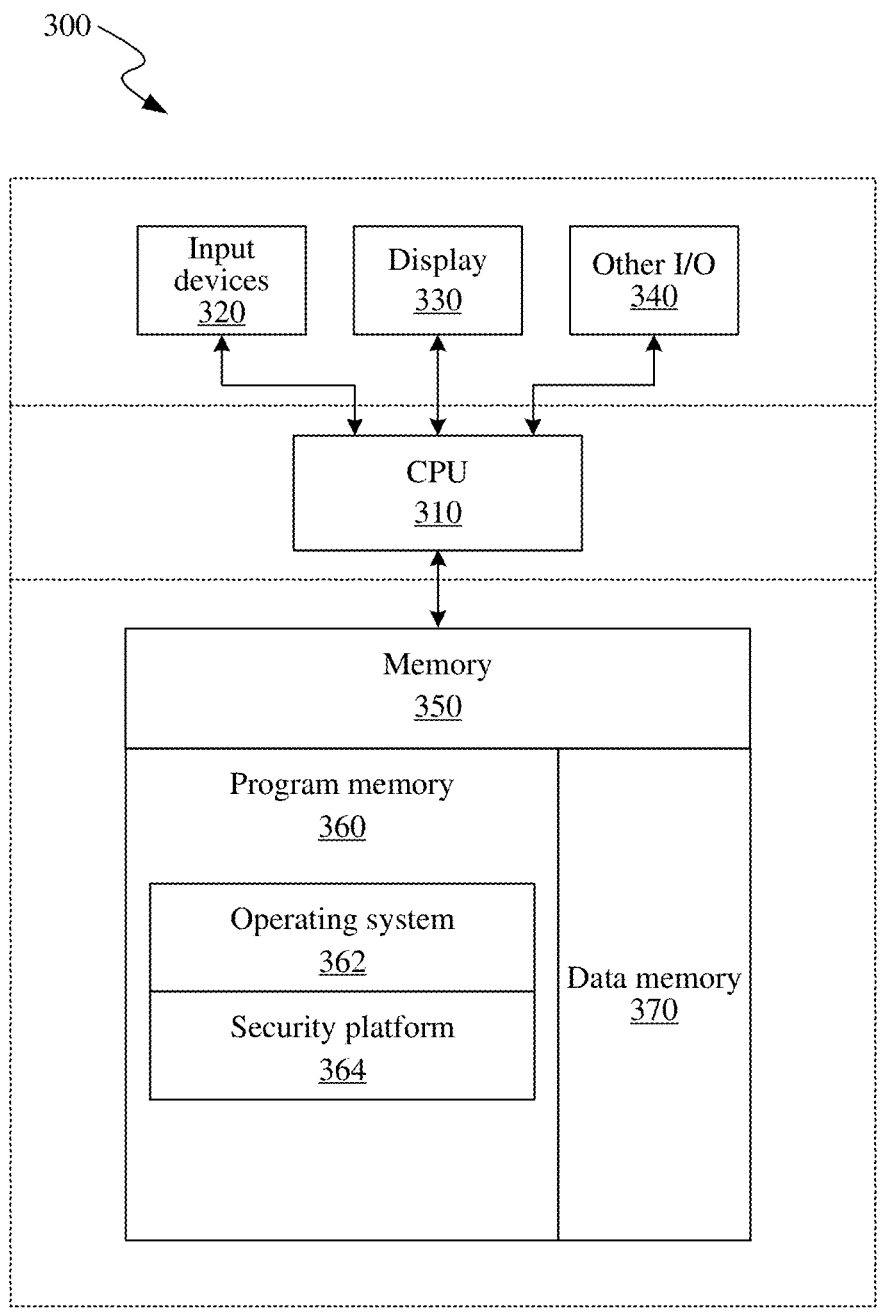
FIG. 3 is a block diagram illustrating an overview of devices on which some implementations of the disclosed technology can operate.

FIG. 3 is a block diagram illustrating an overview of devices on which some implementations of the disclosed technology can operate. The devices can comprise hardware components of a device 300, such as the corporate authorization server that manages the security platform 364 to provide a secure remote access to one or more user devices. In some embodiments, the security platform 364 may include the operations associated with the certificate authority server that generates the secure digital certificate, and/or the operations associated with the MFA provider server that requests authentication information from the user and sends a message to the certificate authority server to generate and send the secure digital certificate to the user device. Device 300 can include one or more input devices 320 that provide input to the CPU (processor) 310, notifying it of actions. The actions are typically mediated by a hardware controller that interprets the signals received from the input device and communicates the information to the CPU 310 using a communication protocol. Input devices 320 include, for example, a mouse, a keyboard, a touchscreen, an infrared sensor, a touchpad, a wearable input device, a camera- or image-based input device, a microphone, or other user input devices.

CPU 310 can be a single processing unit or multiple processing units in a device or distributed across multiple devices. CPU 310 can be coupled to other hardware devices, for example, with the use of a bus, such as a PCI bus or SCSI bus. The CPU 310 can communicate with a hardware controller for devices, such as for a display 330. Display 330 can be used to display text and graphics. In some examples, display 330 provides graphical and textual visual feedback to a user. In some implementations, display 330 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 300 also includes a communication device capable of communicating wirelessly or wire-based with a network node (e.g., a server) or with a user device (e.g., a laptop, desktop, or mobile device). The communication device can communicate with another device or a server through a network using, for example, TCP/IP protocols. Device 300 can utilize the communication device to distribute operations across multiple network devices.

The CPU 310 can have access to a memory 350. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 350 can include program memory 360 that stores programs and software, such as an operating system 362 and security platform 364. The security platform 364 may include processes or methods for enabling secure remote access by using the techniques described in Sections I-III and FIGS. 1-2 of this patent document. Thus, for example, the memory 350 may store instructions that upon execution by CPU 310 configure the device 300 to perform the operations described for the corporate authorization server, the certificate authority server, and/or MFA provider server in FIGS. 1, 2, 5, and/or 6 and/or in the various embodiments described in this patent document. Memory 350 can also include data memory 370 that can include the user profile or public IP address associated with the one or more user devices, which can be provided to the program memory 360 or any element of the device 300.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 4:
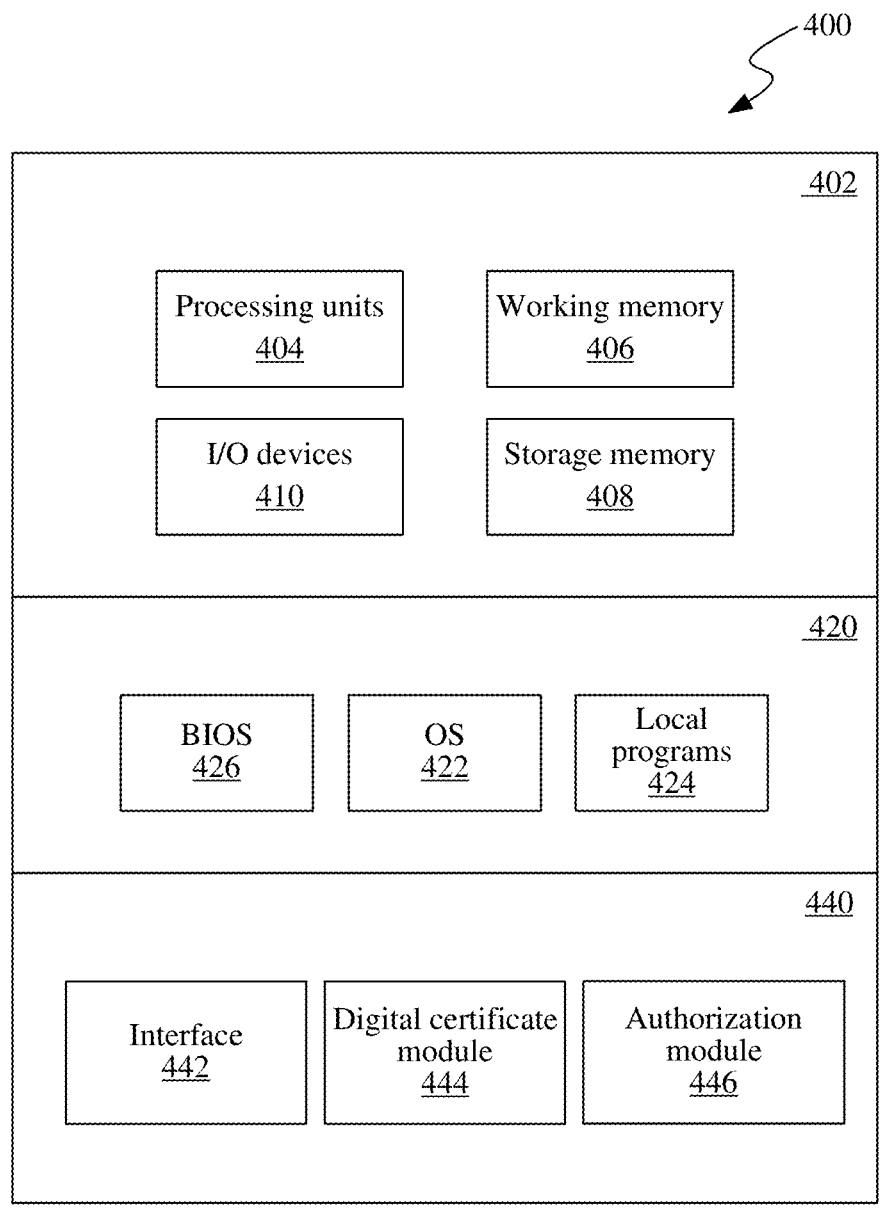
FIG. 4 is a block diagram illustrating components which, in some implementations, can be used in a system employing the disclosed technology.

FIG. 4 is a block diagram illustrating components 400 which, in some implementations, can be used in a system employing the disclosed technology. The components 400 include hardware 402, general software 420, and specialized components 440. As discussed above, a system implementing the disclosed technology can use various hardware, including processing units 404 (e.g., CPUs, GPUs, APUs, etc.), working memory 406, storage memory 408, and input and output devices 410. Some or all of the components 400 can be implemented on a server, such as the corporate authorization server, the certificate authority server, or the MFA provider server. For example, a memory may store instructions that upon execution by the processing units 404 configure the corporate authorization server, certificate authority server, or MFA provider server to perform the operations described in FIGS. 1, 2, 5, and/or 6 and/or in the various embodiments described in this patent document.

General software 420 can include various applications, including an operating system 422, local programs 424, and a basic input output system (BIOS) 426. Specialized components 440 can be subcomponents of a general software application 420, such as local programs 424. Specialized components 440 can include any one or more of a digital certificate module 444 that sends a request for and receives a first public IP address from a user device, and subsequently sends a digital certificate to a router associated with the user device; authorization module 446 that determines whether a public IP address received in a digital certificate from the user device matches the authorized public IP address associated with the digital certificate. In some implementations, components 400 can be in a computing system that is distributed across multiple computing devices or can be an interface to a server-based application executing one or more of specialized components 440.

Those skilled in the art will appreciate that the components illustrated in FIG. 1-4 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system, comprising:
 a first server configured to:
  receive, from a user device, a first request to generate a digital certificate, wherein the first request includes a first public Internet Protocol (IP) address associated with the user device;
  generate and send the digital certificate to a router associated with the user device, wherein the digital certificate includes the first public IP address;
 a second server configured to manage privileges for private and public areas, the second server is configured to:
  receive the digital certificate from the user device, wherein the second server validates the digital certificate with the first server;
  receive, from the user device, a second request to provide a virtual private network (VPN) service to the user device, wherein the second request includes a second public IP address associated with the user device;
  determine that the first public IP address included in the received digital certificate matches the second public IP address;
  determine, based on location data associated with the user device, that the user device is located in a private area or a public area;
  in response to determining the user device is located in the public area, determine, based on a user profile of a user associated with the user device, A) that the user is scheduled to work during a period of time when the second request is received by the second server, and B) an amount of time the user is authorized to work in the public area within the period of time the user is scheduled to work; and
  in response to determining A) that the first public IP address included in the received digital certificate matches the second public IP address, B) that the user device is located in the public area, and C) that the user is scheduled to work at the time, grant the user device access to the VPN service with restricted privileges for the amount of time for the public area.

2. The system of claim 1, wherein the second server is further configured to:
 determine that the digital certificate has expired in response to determining that the first public IP address included in the digital certificate does not match the second IP address; and
 send a message to the user device in response to determining that the digital certificate has expired, wherein the message indicates that a validation step is to be performed to re-authorize the digital certificate.

3. The system of claim 1, wherein the second server is configured to grant the user device access to the VPN service in response to determining that a location of the user matches at least one sanctioned location for the user to work.

4. The system of claim 1, wherein the second server is further configured to:
 deny the user device access to the VPN service used by the user device in response to determining that the user device requests or has downloaded an amount of data that exceeds a pre-determined limit, wherein the pre-determined limit is based on a user profile associated with a login information included in the second request.

5. The system of claim 1, wherein the second server is further configured to:
 receive, from the user device, an audio or an image or a geolocation or a number of available wireless networks associated with a location where the user device is used to request access to the VPN service;
 determine that the user device is located in the public area based on the audio, the image, the geolocation, the number of available wireless networks, or an entity that owns or is associated with the second public IP address; and
 in response to determining that the user device is located in the public area, performing at least one of:
 restrict access to a document that is confidential or that is restricted to a user of the user device; or
 redact one or more confidential portions of a document sent to the user device.

6. The system of claim 1, wherein the second server is further configured to:
 receive, from the user device, an audio or an image or a geolocation or a number of available wireless networks associated with a location where the user device is used to request access to the VPN service;
 determine, based on the audio or the image or the geolocation or the number of available wireless networks, that the user device is located in the public area; and determine that a privacy screen is installed in front of a display associated with the user device in response to determining that the user device is located in the public area, wherein the second server is configured to grant the user device access to the VPN service in response to determining that the first public IP address included in the digital certificate matches the second public IP address and in response to determining that the privacy screen is being used by the user device.

7. The system of claim 6, wherein the second server is configured to determine that the privacy screen is installed in front of the display by receiving an image obtained from a camera associated with the user device, and wherein the image provides a color profile of the display.

8. The system of claim 1, wherein the second server is further configured to:

determine a level of access to a document by a user of the user device, wherein the level of access is determined based on a user profile associated with a login information included in the second request, and wherein the user profile is associated with the user's employment role or employment title;

perform any one of following in response to determining the level of access to the document by the user:

allow the user access to the document in response to determining that the level of access allows the user to access all types of documents;

restrict the user access to the document in response to determining that the level of access is limited to non-confidential documents; and allow the user to access non-confidential portions of the document in response to determining that the level of access is limited to non-confidential documents.

9. The system of claim 1, wherein the first request includes one or more additional data that identifies the user device, wherein the digital certificate is generated to include the one or more additional data.

10. The system of claim 9, wherein the one or more additional data includes:

a private IP address of the user device, a central processing unit (CPU) identifier of the user device, a universally unique identifier (UUID) associated with the user device, a hardware identifier associated with the user device, a token identifier associated with the user device, or a multi-factor authorization provider information associated with the user device.

11. The system of claim 1, further comprising:

a third server, configured to:

receive a first message from the user device that the user device has sent the first request to generate the digital certificate;

send a third request to the user device to provide a password associated with a user of the user device; and in response to determining that the received password matches previously known password associated with the user, send a second message to the first server to generate and send the digital certificate to the user device.

12. The system of claim 1, wherein the second server is further configured to:

receive audio or video data from an electronic eyeglass via the user device.

13. The system of claim 1, wherein the first public IP address is same as the second public IP address.

14. The system of claim 1, wherein the digital certificate is encrypted using a public key associated with the user device.

15. A non-transitory computer-readable medium comprising computer-readable instructions for providing network security, said computer-readable instructions comprising instructions that:

receive a digital certificate from a user device, wherein the digital certificate includes a first public Internet Protocol (IP) address;

validate the digital certificate;

receive, from the user device, a request to provide a virtual private network (VPN) service to the user device, wherein the request includes a second public IP address associated with the user device;

determine that the first public IP address included in the received digital certificate matches the second public IP address;

determine, based on location data associated with the user device, that the user device is located in a public area of a private area;

in response to determining the user device is located in the public area, determine, based on a user profile of a user associated with the user device, A) that the user is scheduled to work during a period of time when the second request is received by a server, and B) an amount of time the user is authorized to work in the public area within the period of time the user is scheduled to work; and in response to determining A) that the first public IP address included in the received digital certificate matches the second public IP address, B) that the user device is located in the public area, and C) that the user is scheduled to work at the time, grant the user device access to the VPN service with restricted privileges for the amount of time for the public area.

16. The non-transitory computer-readable medium of claim 15, wherein said computer readable instructions further comprise instructions that:

determine that the digital certificate has expired in response to determining that the first public IP address included in the digital certificate does not match the second IP address; and send a message to the user device in response to determining that the digital certificate has expired, wherein the message indicates that a validation step is to be performed to re-authorize the digital certificate.

17. The non-transitory computer-readable medium of claim 15, wherein the user device is granted access to the VPN service in response to determining that a location of the user matches at least one sanctioned location for the user to work.

18. The non-transitory computer-readable medium of claim 15, wherein said computer readable instructions further comprise instructions that:

deny the user device access to the VPN service used by the user device in response to determining that the user device requests or has downloaded an amount of data that exceeds a pre-determined limit, wherein the pre-determined limit is based on a user profile associated with a login information included in the request.

19. The non-transitory computer-readable medium of claim 15, wherein the first public IP address is same as the second public IP address.

20. A method for providing network security, comprising:
receiving a digital certificate from a user device, wherein the digital certificate includes a first public Internet Protocol (IP) address;
validating the digital certificate;
receiving, from the user device, a request to provide a virtual private network (VPN) service to the user device, wherein the request includes a second public IP address associated with the user device;
determining that the first public IP address included in the received digital certificate matches the second public IP address;
determining, based on location data associated with the user device, that the user device is located in a public area or a private area;
in response to determining the user device is located in the public area, determining, based on a user profile of a user associated with the user device, A) that the user is scheduled to work during a period of time when the second request is received by server, and B) an amount of time the user is authorized to work in the public area within the period of time the user is scheduled to work; and
in response to determining A) that the first public IP address included in the received digital certificate matches the second public IP address, B) that the user device is located in the public area, and C) that the user is scheduled to work at the time, granting the user device access to the VPN service with restricted privileges for the amount of time the public area.

* * * * *